INVENTOR.
STANLEY J. RUSK

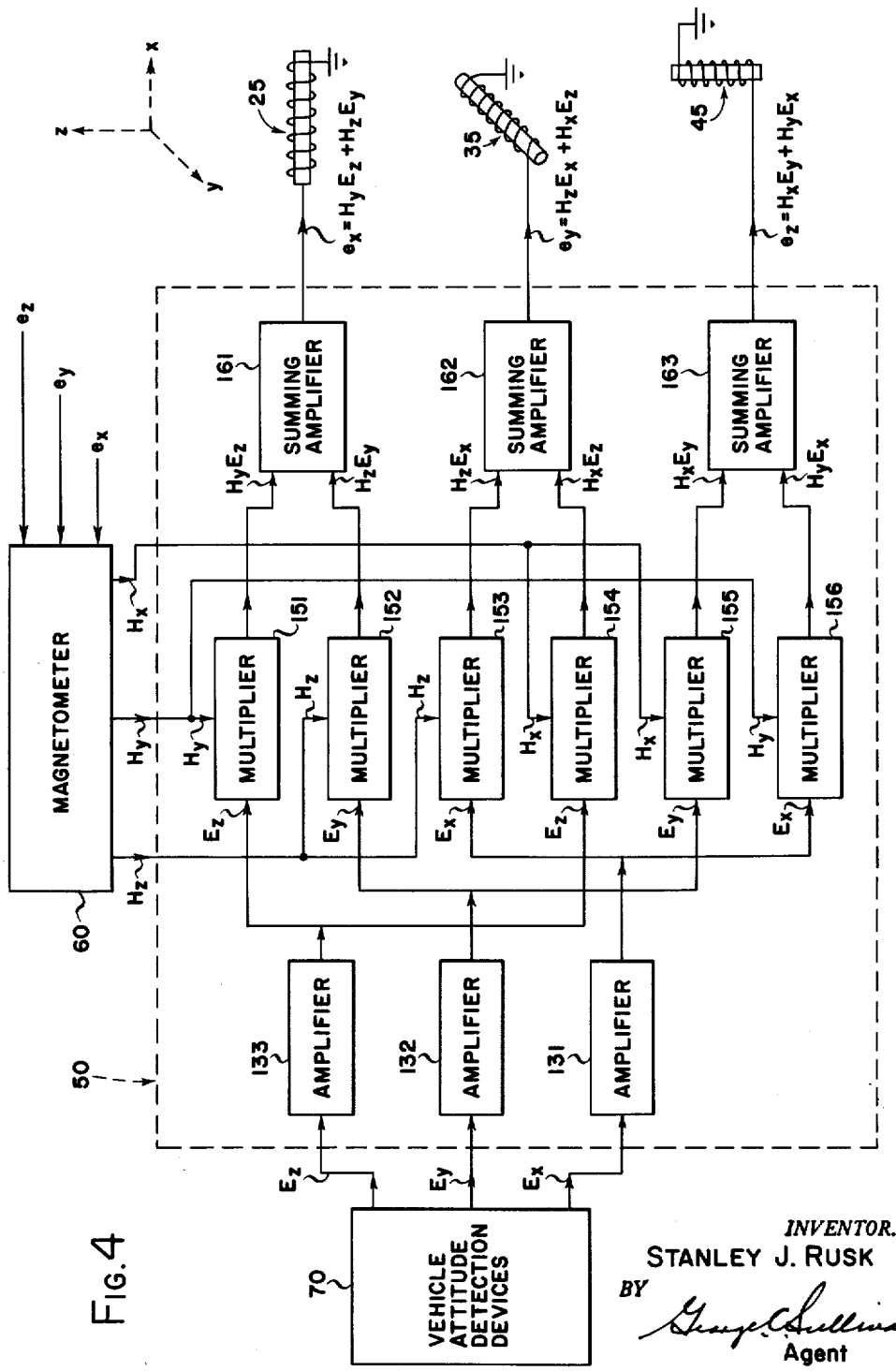

United States Patent Office

3,061,239
Patented Oct. 30, 1962

3,061,239
MAGNETIC MOMENT DEVICE FOR APPLYING CORRECTIVE TORQUE TO A SPACE VEHICLE
Stanley J. Rusk, Los Altos Hills, Calif., assignor to Lockheed Aircraft Corporation, Burbank, Calif.
Filed Aug. 4, 1960, Ser. No. 47,502
4 Claims. (Cl. 244—1)

This invention relates generally to means and methods of controlling a vehicle in space, and more particularly to a magnetic moment device for applying corrective torques to a space vehicle.

With the arrival of the space age as a result of the successful launching of space satellites, it has become of increasing importance to provide improved means and methods of providing corrective torques to correct the attitude of a vehicle in space. While there are various known approaches for providing corrective torques, such as the ejection of mass from a space vehicle in predetermined directions, for the most part these known approaches result in bulky and unduly weighted systems which are incapable of reliably operating over very long periods of time.

Accordingly, it is the broad object of this invention to provide improved means and methods for applying corrective torques to a space vehicle.

A more specific object of this invention is to provide improved means and methods of applying corrective torques to a space vehicle by means of a device which can be constructed in a reliable and compact structure and involves no mechanical motion with respect to the vehicle.

Another object of this invention is to provide a static magnetic moment device for applying corrective torques to a space vehicle in response to correction signals derived from conventional vehicle attitude detection devices.

A further object of this invention is to provide a static magnetic moment device for maintaining a satellite in a predetermined orientation with respect to its orbit and the earth.

The above objects are accomplished in accordance with a typical embodiment of the present invention by making use of the torque produced by magnetic interaction between the earth's magnetic field and a predetermined magnetic field developed on the space vehicle in response to attitude control signals derived from conventional vehicle attitude detection devices. An important feature of such a system is that there is no requirement for a uniform, stationary or predictable earth's magnetic field.

The specific nature of the invention as well as other objects, advantages and uses thereof will clearly appear from the following description and the accompanying drawing in which:

FIG. 4 is a schematic and block diagram of the embodiment of FIG. 3 showing a preferred embodiment of the computer of FIG. 3.

Like numerals designate like elements throughout the figures of the drawing.

Figure 1:
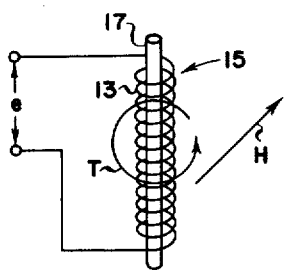
FIGS. 1 and 2 are schematic diagrams which will be used in explaining the basic concept of the invention.

In FIG. 1 a magnetic torquing coil 15 is shown located in a magnetic field H having a direction at an angle to the longitudinal axis of the coil 15. The magnetic torquing coil 15 comprises a rod 17 of magnetic material, such as a ferromagnetic core, upon which is wound a winding 13 and means are provided for applying a voltage signal $e$ across the winding 13.

It will be understood that current flow through the winding 13 of the torquing coil 15 produces a magnetic field parallel to the longitudinal axis of the rod 17 which will interact with the field H to produce a torque on the coil 15 in a direction which acts to line up the coil 15 in the direction of the field H. If the field H is assumed to be in the plane of the drawing in the direction shown, the torque produced will be as indicated at T, the direction of the torque T depending on the direction of current flow through the winding 13.

Figure 2:
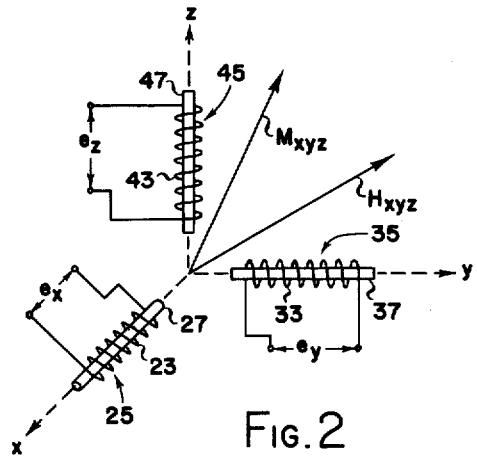

Based on the well known magnetic phenomena just described, a highly advantageous magnetic moment device may be devised for applying corrective or controlling torques to a space vehicle. FIG. 2 is a basic diagrammatic view of such a device.

In FIG. 2 three mutually perpendicular magnetic torquing coils 25, 35 and 45 having magnetic cores 27, 37 and 47 and windings 23, 33 and 43, respectively (similar to 15 in FIG. 1), are rigidly mounted to a space vehicle along suitable axes thereof which will be designated as $x$, $y$ and $z$ as shown. Voltage signals $e_x$, $e_y$ and $e_z$ are adapted to be applied across the windings 23, 33 and 43, respectively, by any suitable means. The magnetic field in space with respect to the three vehicle axes $x$, $y$ and $z$ is indicated by the arrow designated as $H_{xyz}$.

It will now be understood that if the signals $e_x$, $e_y$ and $e_z$ are properly chosen a resultant magnetic field $M_{xyz}$ can be developed which interacts with the earth's magnetic field $H_{xyz}$ to provide a predetermined torque on the space vehicle. It thus becomes possible to apply predetermined torques to a space vehicle for a wide variety of purposes merely by developing a predetermined magnetic field on the vehicle without the need for ejecting mass from the vehicle or using other mechanical means for obtaining control forces.

Of course, the magnitude of the torque developed on the vehicle is limited by the magnitude of the earth's magnetic field which diminishes with the inverse cube of the distance of the vehicle from the center of the earth. However, calculations indicate that with a total required system weight of a device in accordance with the invention of the order of 170 pounds, torques of the order of 1 ounce-inch are possible at distances from the earth as great as 4,000 miles. Also, because torque can not be developed about an axis parallel to the earth's magnetic field, there will always be one particular direction on the vehicle at any instant about which a torque can not be developed. However, as long as the vehicle is not constantly moving parallel to the earth's magnetic field, the direction of the earth's magnetic field with respect to the vehicle will change so that loss of control in any one vehicle direction will normally be only temporary.

Unless the vehicle is traversing a precise equatorial orbit of constant altitude the direction and/or magnitude of the earth's magnetic field will be constantly changing. The foregoing may be appreciated by considering theoretical lines of force extending from the North Pole of the earth to the South Pole. Thus, on a polar orbit the magnitude of magnetic field would vary from a maximum over the equator to substantially zero over either of the Poles.

Figure 3:
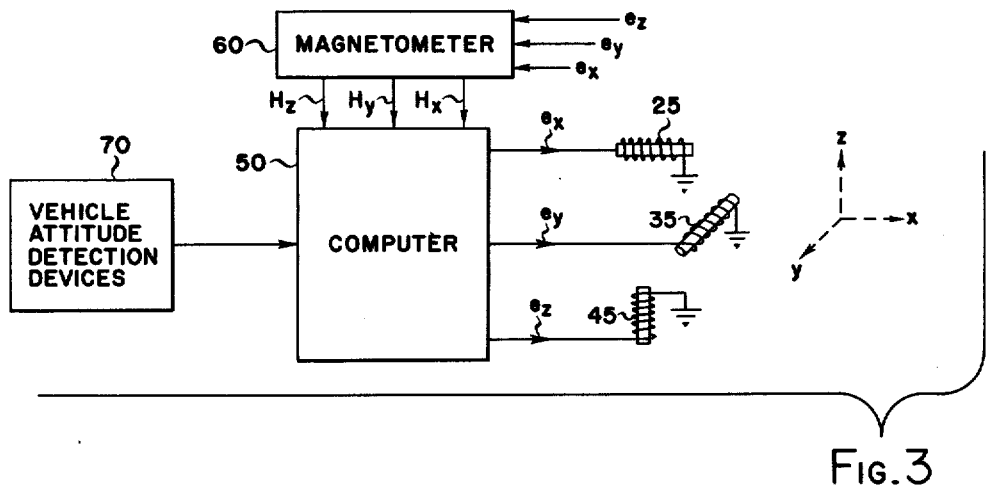
FIG. 3 is a schematic and block diagram of a basic embodiment of a static magnetic moment device in accordance with the invention.

The basic concept of the invention described above can advantageously be applied to a satellite orbiting the earth for the purpose of maintaining the satellite in a desired orientation with respect to the orbit and the earth. A basic embodiment of such an application is shown in FIG. 3. The mutually perpendicular torquing coils 25, 35 and 45 are rigidly mounted to the satellite and may be the same as in FIG. 2, the axes $x$, $y$ and $z$ corresponding to the axes of the vehicle. As will be understood by those skilled in the art, these torquing coils 25, 35 and 45 need not be arranged with their axes concurrent, since the resultant torque will be the same in either case.

Information as to the attitude of the satellite is now provided by conventional vehicle attitude detection devices indicated at 70 which produce correction signals dependent upon the deviation of the vehicle from a reference orientation. Such vehicle attitude devices are well known in the art and can readily be provided in various forms, for example, horizon scanners and gyros. The correction signals are fed to a computer 50, preferably electronic, along with information regarding the magnitude and polarity of the earth's magnetic field $H_{xyz}$ in the axial directions $H_x$, $H_y$ and $H_z$ obtained from a conventional magnetometer 60. Unless the satellite is travelling an equatorial orbit at constant altitude, the magnitude and polarity of the earth's magnetic field $H_{xyz}$ will be constantly changing as will the components $H_x$, $H_y$, and $H_z$. Devices for detecting the magnitude and polarity of axial components $H_x$, $H_y$, and $H_z$, are so well known by those skilled in the art that they are here considered together as magnetometer 60. The computer 50 is adapted to operate on the correction signals in accordance with the information of the earth's magnetic field to produce output signals $e_x$, $e_y$ and $e_z$ for the torquing coils 25, 35 and 45, respectively, so that in the event of a disturbing influence which deflects the vehicle, corrective torques are produced as a result of interaction between the magnetic field $M_{xyz}$ developed by the torquing coils and the earth's magnetic field $H_{xyz}$ which act to return the vehicle to the desired orientation. The output signals $e_x$, $e_y$ and $e_z$ are fed to the magnetometer 60 to permit the magnetometer to be compensated against the magnetic field $M_{xyz}$ developed by the torquing coils 25, 35 and 45. The incorporation of compensation means on a magnetometer is well known in the art.

It will be appreciated that there are many possible ways of designing the computer 50 for proper operation of the embodiment of FIG. 3 by means of presently known techniques. However, in order to make the most efficient use of the magnetic forces available and to permit the use of a simplified computer 50, it is important to employ the proper approach to the computing operation. An advantageous approach to the computing operation is incorporated in the specific embodiment of the invention illustrated in FIG. 4.

Figure 5:
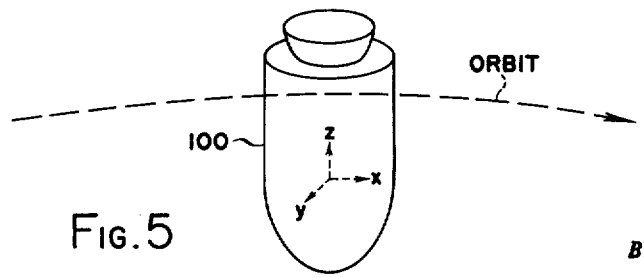
FIG. 5 is a diagrammatic view of the orientation of a satellite in which the embodiment of FIG. 4 may be incorporated.

In FIG. 4, the mutually perpendicular torquing coils 25, 35 and 45 are rigidly mounted to the satellite along the $x$, $y$ and $z$ axes thereof. The $x$, $y$ and $z$ axes of the satellite 100 are illustrated in FIG. 5. The desired orientation of the satellite 100 is with its $z$ axis vertical, its $x$ axis in the place of the orbit (that is, horizontal with respect to the earth), and its $y$ axis parallel to the orbital angular velocity vector. Variation of the satellite about its $x$ axis is conventionally referred to as roll, about its $y$ axis as pitch, and about its $z$ axis as yaw. The purpose of the specific embodiment of FIG. 4 is to maintain the $x$, $y$ and $z$ axes of the satellite in the orientation shown in FIG. 5.

The magnetometer 60 shown in FIG. 4 is the same as that of FIG. 3, the components $H_x$, $H_y$ and $H_z$ representing the measured components of the earth's magnetic field along the $x$, $y$, and $z$ directions of the satellite. Also, the vehicle attitude detection devices 70 are the same as that of FIG. 3, except that the correction signals derived therefrom along each of the $x$, $y$, and $z$ axes of the satellites are indicated separately, the correction signals $E_x$, $E_y$ and $E_z$ representing satellite attitude variations about the $x$, $y$ and $z$ axes, respectively. The computer 50 of FIG. 3 is shown more specifically in FIG. 4 and employs an advantageous computing operation which significantly increases the advantages of this invention. However, before considering the computer 50 of FIG. 4 in detail, some theoretical considerations will first be presented to provide a basis for the description of the computing operation to follow.

The torque $T_{xyz}$ produced on the satellite as a result of the interaction of the earth's magnetic field $H_{xyz}$ and the magnetic field $M_{xyz}$ (shown in FIG. 2) developed as a result of the signals $e_x$, $e_y$ and $e_z$ applied to the torquing coils 25, 35 and 45, respectively, may now be written in vector form as:

$$T_{xyz} = M_{xyz} \times H_{xyz} \qquad (1)$$

where $$\left.\begin{array}{l} T_{xyz} = iT_x + jT_y + kT_z \\ H_{xyz} = iH_x + jH_y + kH_z \\ M_{xyz} = iM_x + jM_y + kM_z \end{array}\right\} \qquad (2)$$

and $i$, $j$ and $k$ are unit vectors directed along the satellite axes $x$, $y$ and $z$, respectively. Thus, we now get using matrix notation:

$$M_{xyz} \times H_{xyz} = \begin{vmatrix} i & j & k \\ M_x & M_y & M_z \\ H_x & H_y & H_z \end{vmatrix}$$

so that the torque $T_{xyz}$ is $$T_{xyz} = i(M_yH_z - M_zH_y) - j(M_xH_z - M_zH_x) \\ + k(M_xH_y - M_yH_x) \qquad (3)$$

and the torques $T_x$, $T_y$ and $T_z$ about the $x$, $y$ and $z$ axes, respectively, can be written as:

$$\left.\begin{array}{l} T_x = M_yH_z - M_zH_y \\ T_y = M_zH_x - M_xH_z \\ T_z = M_xH_y - M_yH_x \end{array}\right\} \qquad (4)$$

The torque about $H_{xyz}$ is obviously zero since $$T_{xyz} \cdot H_{xyz} = (M_{xyz} \times H_{xyz}) \cdot H_{xzy} = 0 \qquad (5)$$

so that expanding $T_{xyz}$ and $H_{xyz}$ into components as in Equations 2 and substituting in Equation 5 now gives $$T_{xyz} \cdot H_{xyz} = (iT_x + jT_y + kT_z) \cdot (iH_x + jH_y + kH_z) = 0$$

which reduces to $$T_xH_x + T_yH_y + T_zH_z = 0 \qquad (6)$$

The above Equation 6 states that by specifying the torques about two of the three axes amounts to specifying the torques about all three axes. Thus, it is not possible to manipulate the satellite magnetic moment components to provide uncoupled torques about the individual $x$, $y$ and $z$ axes in response to errors about these axes; that is, the computer 50 shown in FIG. 3 cannot be designed to yield magnetic torques of the form:

$$\left.\begin{array}{l} T_x = f(E_x) \\ T_y = f(E_y) \\ T_z = f(E_z) \end{array}\right\} \qquad (7)$$

where $E_x$, $E_y$ and $E_z$ represent satellite attitude variations about the $x$, $y$ and $z$ axes, respectively.

From the above Equations 7 it can be seen that coupling is inevitable. In the computer 50 of FIG. 4, therefore, attempts at decoupling are abandoned in favor of efficiency. The signal ($e_x$, $e_y$ or $e_z$) fed to a particular torquing coil along one axis is chosen in accordance with the correction signals ($E_x$, $E_y$, $E_z$) corresponding to attitude variations about the other two axes which are perpendicular to the axis of the torquing coil, each correction signal weighted by the opposite axial component of the earth's magnetic field. For example, the signal $e_x$ feeding the torquing coil 25 along the $x$ axis of the satellite is regulated by the correction signals $E_y$ and $E_z$ corresponding to attitude variations about the $y$ and $z$ axes of the satellite, and the correction signals $E_y$ and $E_z$ are weighted by the earth's magnetic field components $H_z$ and $H_y$, respectively. Thus, each torquing coil will be most effective in providing torque and proper phasing will automatically be achieved, regardless of the orientation of the earth's magnetic field. The resulting computer 50 can therefore be provided in relatively simple and non-critical form as will now be shown.

In the computer 50 of FIG. 4, the attitude correction signals $E_x$, $E_y$ and $E_z$ about the $x$, $y$ and $z$ axes, respectively, are first fed to amplifiers 131, 132 and 133, respectively, to amplify the correction signals to a suitable level. Six multipliers 151, 152, 153, 154, 155 and 156 are then provided for multiplying each attitude correction signal by the earth's magnetic field components along the two axes perpendicular to the axis to which the attitude correction signal corresponds. Specifically, the multiplier 151 forms the product $H_yE_z$, the multiplier 152 forms the product $H_zE_y$, the multiplier 153 forms the product $H_zE_x$, the multiplier 154 forms the product $H_xE_z$, the multiplier 155 forms the product $H_xE_y$, and the multiplier 156 forms the product $H_yE_x$. Multipliers such as indicated by multipliers 151–156 are well known in the art and can readily be provided.

Summing amplifiers 161, 162 and 163 having their outputs coupled to the torquing coils 25, 35 and 45, respectively, are each adapted to receive the two products of the total of six products from the multipliers 151–156 which correspond to attitude correction signals and earth's magnetic field components about axis perpendicular to the axis of the corresponding torquing coil. Thus, the products $H_yE_z$ and $H_zE_y$ are fed to the summing amplifier 161 coupled to the $x$ axis torquing coil 25, the products $H_zE_x$ and $H_xE_z$ are fed to the summing amplifier 162 coupled to the $y$ axis torquing coil 35, and the products $H_xE_y$ and $H_yE_x$ are fed to the summing amplifier 163 coupled to the $z$ axis torquing coil 45. The values of $e_x$, $e_y$ and $e_z$ obtained at the outputs of the summing amplifiers 161, 162 and 163 applied to the torquing coils 25, 35 and 45, respectively, may therefore be expressed as:

$$\left.\begin{array}{l} e_x = H_yE_z + H_zE_y \\ e_y = H_zE_x + H_xE_z \\ e_z = H_xE_y + H_yE_x \end{array}\right\} \quad (8)$$

It then follows that the magnetic field components $M_x$, $M_y$ and $M_z$ developed by the torquing coils 25, 35 and 45, respectively, as a result of the signals $e_x$, $e_y$ and $e_z$ provided by the computer 50 of FIG. 4 may be written as:

$$\left.\begin{array}{l} M_x = K_x(H_yE_z + H_zE_y) \\ M_y = K_y(H_zE_x + H_xE_z) \\ M_z = K_z(H_xE_y + H_yE_x) \end{array}\right\} \quad (9)$$

where $K_x$, $K_y$ and $K_z$ are constants.

From Equations 4 and 9 the torques $T_x$, $T_y$ and $T_z$ along the $x$, $y$ and $z$ axes now become:

$$\left.\begin{array}{l} T_x = K_y(H_zE_x + H_xE_z)H_z - K_z(H_xE_y + H_yE_x)H_y \\ T_y = K_z(H_xE_y + H_yE_x)H_x - K_x(H_yE_z + H_zE_y)H_z \\ T_z = K_x(H_yE_z + H_zE_y)H_y - K_y(H_zE_x + H_xE_z)H_x \end{array}\right\} \quad (10)$$

Study of the above Equations 10 will reveal that the torquing coils which are in the best position to provide torque are magnetized most intensely and the proper phasing of the component magnetic fields developed are automatically provided as a result of the proper incorporation of the earth's magnetic field components $H_x$, $H_y$ and $H_z$ in the equations. The stability of the general torque equations given in (10) above can clearly be demonstrated on a computer to show that the corrective torques produced will act to maintain the satellite in a desired orientation. Also, the following special cases will illustrate the stable nature of the corrective torques.

First, for small departures from level flight near a cardinal heading at the equator, the cross product terms and $H_z^2$ may be neglected so that Equations 10 may initially be reduced to:

$$\left.\begin{array}{l} T_x \cong -K_zH_y^2E_x \\ T_y \cong K_zH_x^2E_y \\ T_z \cong K_xH_y^2E_z - K_yH_x^2E_z \end{array}\right\} \quad (11)$$

For north-south flight $H_y = 0$ so that Equations 11 further reduce to:

$$\left.\begin{array}{l} T_x \cong 0 \\ T_y \cong K_zH_x^2E_y \\ T_z \cong -K_yH_x^2E_z \end{array}\right\} \quad (12)$$

Alternatively, for east-west flight $H_x = 0$ so that Equations 11 further reduce to:

$$\left.\begin{array}{l} T_x \cong -K_zH_y^2E_x \\ T_y \cong 0 \\ T_z \cong -K_xH_y^2E_z \end{array}\right\} \quad (13)$$

Second, for small departures from level flight at the magnetic poles, only the terms involving $H_z^2$ are important so that Equations 10 now reduce to:

$$\left.\begin{array}{l} T_x \cong K_yH_z^2E_x \\ T_y \cong -K_xH_z^2E_y \\ T_z \cong 0 \end{array}\right\} \quad (14)$$

Equations 11–14 show that in constrained attitude flight at the equator and poles, the torque Equations 10 reduce properly to compatible functions governed by the attitude departures from reference directions.

As mentioned previously, torque cannot be developed about an axis perpendicular to the direction of the earth's magnetic field. This means that when the direction of the earth's magnetic field is parallel to one of the satellite axes $x$, $y$ or $z$ control about that axis will be lost. For example, in polar orbits, the pitch (attitude variations about the $y$ axis) is always under control and the roll and yaw controllabilities (attitude variations about the $x$ and $z$ axes, respectively) vary with the latitude, the yaw controllability being lost at the poles and the roll controllability being lost at the equator. This interchange of roll and yaw control capability in polar orbits is not a serious handicap, since control is lost only temporarily and it is generally not necessary to subdue attitude transients in less than a quarter of an orbit.

In equatorial orbits the roll and yaw are always under control, but because the earth's magnetic field will be parallel to the $y$ or roll axis, there will be a loss of pitch control. In such equatorial orbits, therefore, some other provision may be necessary to control pitch. Except for the loss of pitch control in equatorial orbits (which are not of particular significance), it will be evident that the present invention is capable of providing adequate orientation control about all three roll, yaw and pitch axes of a satellite.

It is to be understood in connection with the present invention that the embodiments described herein are only exemplary and many modifications and variations in construction and arrangement are possible without departing from the spirit of the invention.

For example, the invention may be employed for providing orientation control only about one axis if so desired and other means might be used for providing control about the other two axes. Also, the computer 50 could be provided in various ways, depending upon the particular application. Still further, the invention is not limited to earth satellites or to use of the earth's magnetic field and the invention should operate in the same manner with magnetic fields associated with other planets or bodies in the universe or even with man-made magnetic fields such as might be provided by a space station. The use of the term earth's magnetic field is intended to include the use of such other magnetic fields.

The above examples are not exhaustive and the invention is to be considered as including all modifications and variations in construction and arrangement coming within the scope of the appended claims.

I claim as my invention:

1. A control system for a space vehicle comprising: a vehicle attitude detection means adapted to produce electrical signals corresponding to the attitude variations of the vehicle about at least one axis thereof, a magnetometer on said vehicle adapted to produce an electrical signal having a magnitude and polarity proportional to the component of the earth's magnetic field along an axis of the vehicle, a computer on said vehicle to which the signals from said attitude detection means and said magnetometer are fed, and means on said vehicle for developing a magnetic field in response to output signals obtained from said computer, said computer being constructed and arranged to apply signals to said last mentioned means in response to the electrical signals from said attitude detection means and said magnetometer so that attitude variations of said vehicle result in a magnetic field being developed by said last mentioned means which interacts with the earth's magnetic field to apply corrective torques to said vehicle.

2. The invention in accordance with claim 1, wherein said last mentioned means includes at least two mutually perpendicular torquing coils each having a rod of magnetic material and a winding thereon adapted to receive output signals from said computer.

3. An orientation control system for a satellite comprising: satellite attitude detection means adapted to produce electrical signals corresponding to the attitude variations of said satellite about roll, pitch and yaw axes thereof, a magnetometer on said vehicle adapted to produce electrical signals proportional to the magnitude and polarity of the earth's magnetic field in the direction of the roll, pitch and yaw axes of said satellite, a computer on said satellite to which the signals from said attitude detection means and said magnetometer are fed, and means on said satellite adapted to develop magnetic fields in directions parallel to the roll, pitch and yaw axes of said satellite in response to output signals obtained from said computer, said computer being constructed and arranged to apply signals to said last mentioned means in response to the electrical signals from said attitude detection devices and said magnetometer so that attitude variations of said satellite result in magnetic fields being developed by said last mentioned means which interact with the earth's magnetic field to apply corrective torques to said satellite.

4. An orientation control system for a space vehicle comprising: space vehicle attitude detection means adapted to produce electrical signals $E_x$, $E_y$ and $E_z$ corresponding to the attitude variations of said vehicle about $x$, $y$ and $z$ mutually perpendicular axes thereof, a magnetometer on said vehicle adapted to produce electrical signals $H_x$, $H_y$ and $H_z$ respectively proportional to the magnitude and polarity of the earth's magnetic field in the direction of the $x$, $y$ and $z$ axes of said vehicle, a computer on said vehicle to which the signals $E_x$, $E_y$ and $E_z$ from said attitude detection devices and the signals $H_x$, $H_y$ and $H_z$ are fed, and means on said satellite adapted to develop magnetic fields in directions parallel to said $x$, $y$ and $z$ axes, said last mentioned means including three mutually perpendicular torquing coils each having a rod of magnetic material parallel to one of said $x$, $y$ and $z$ axes and a winding thereon to which output signals from said computer are fed, said computer being adapted to produce output signals proportional to $H_yE_z+H_zE_y$, $H_zE_x+H_xE_z$, and $H_xE_y+H_yE_x$ which are fed to the $x$, $y$ and $z$ torquing coils, respectively.

References Cited in the file of this patent

Roberson: "Where Do We Stand on Attitude Control?" Research and Development Technical Handbook, V2, 1958–1959, pp. B–5 through B–10.

UNITED STATES PATENT OFFICE
CERTIFICATE OF CORRECTION

Patent No. 3,061,239

October 30, 1962

Stanley J. Rusk

It is hereby certified that error appears in the above numbered patent requiring correction and that the said Letters Patent should read as corrected below.

Column 2, lines 60 to 62, for "magnetic field would vary from a maximum over the equator to substantially zero over either of the Poles" read -- the earth's magnetic field varies from a minimum at the equator to a maximum, equal to twice the minimum at the Poles --.

Signed and sealed this 1st day of October 1963.

(SEAL)
Attest:

ERNEST W. SWIDER
Attesting Officer

DAVID L. LADD
Commissioner of Patents